(12) United States Patent
Liu et al.

(10) Patent No.: US 12,237,883 B2
(45) Date of Patent: Feb. 25, 2025

(54) AUGMENTED CONFIGURATION INTERFACE FOR VISUALIZING AND OPTIMIZING BEAMFORMING

(71) Applicant: International Business Machines Corporation, Armonk, NY (US)

(72) Inventors: Su Liu, Austin, TX (US); Jeremy R. Fox, Georgetown, TX (US); Tushar Agrawal, West Fargo, ND (US); Zachary A. Silverstein, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 18/111,543

(22) Filed: Feb. 18, 2023

(65) Prior Publication Data
US 2024/0283495 A1   Aug. 22, 2024

(51) Int. Cl.
*H04L 5/12* (2006.01)
*H04B 7/0426* (2017.01)
(Continued)

(52) U.S. Cl.
CPC ............ *H04B 7/043* (2013.01); *H04W 16/18* (2013.01); *H04W 16/225* (2013.01)

(58) Field of Classification Search
CPC . H04W 76/18; H04W 36/06; H04W 74/0833; H04W 24/08; H04B 7/0639; H04B 7/0663; H04B 7/06966; H04B 7/0695; H04B 7/0408; H04L 5/0023; H04L 5/0091; H04L 5/005
(Continued)

(56) References Cited

U.S. PATENT DOCUMENTS 9,632,668 B2    4/2017 Xie et al.
10,743,188 B2 *  8/2020 Apostolopoulos .... H04W 16/14
(Continued)

FOREIGN PATENT DOCUMENTS

WO    2020/251680 A1   12/2020
WO    2022/144203 A1    7/2022

OTHER PUBLICATIONS

"Augmented Reality Interface for Visualizing and Interacting with IoT Devices," IP.com No. IPCOM000255233D, Sep. 11, 2018.
(Continued)

*Primary Examiner* — Helene E Tayong
(74) *Attorney, Agent, or Firm* — Robert R. Aragona

(57) ABSTRACT

A method for configuring beamforming for a network device is disclosed. In one embodiment, such a method includes creating a map of an area in which a network device that supports beamforming is placed. The method shows, on an interactive display device, the network device on the map. The method shows, on the interactive display device, one or more beams emanating from the network device on the map. The method enables a user to manipulate the beams on the interactive display device to create a desired beamforming pattern that takes into account the map and receiving devices located in the area. The claimed method is advantageous in that it may enable a user to establish or modify a beamforming pattern in a more intuitive, visual way. A corresponding system and computer program product are also disclosed.

25 Claims, 8 Drawing Sheets

(51) Int. Cl.
*H04W 16/18* (2009.01)
*H04W 16/22* (2009.01)

(58) Field of Classification Search
USPC ........................................................ 375/262
See application file for complete search history.

(56) References Cited

U.S. PATENT DOCUMENTS

| | | |
|---|---|---|
| 11,165,519 B2 | 11/2021 | Dion et al. |
| 2015/0282001 A1* | 10/2015 | Kwak ................. H04B 7/0695 |
| | | 370/229 |
| 2018/0115958 A1* | 4/2018 | Raghavan ............. H04W 36/32 |
| 2021/0409082 A1 | 12/2021 | Kontio et al. |
| 2022/0077908 A1 | 3/2022 | Huh et al. |
| 2022/0138388 A1 | 5/2022 | Wang et al. |
| 2022/0205874 A1 | 6/2022 | Macoskey et al. |
| 2022/0286885 A1 | 9/2022 | Wang et al. |

OTHER PUBLICATIONS

Zhang, Y. et al., "Channel Adapted Antenna Augmentation for Improved Wi-Fi Throughput," IEEE Transactions on Mobile Computing, Aug. 2022.

Introduction to 802.11ax High-Efficiency Wireless, https://www.ni.com/en-us/innovations/white-papers/16/introduction-to-802-11ax-high-efficiency-wireless.html, Updated Feb. 7, 2023.

Goyal, Aman, et al., Sagacious IP Blog, "Wi-Fi 6, Wi-Fi 6E & its Patent Filing Trends: Indications of the Next Evolution in WLAN Technology", available at: https://sagaciousresearch.com/blog/wi-fi-6-and-wi-fi-6e-patent-filing-trends-next-evolution-in-wlan-technology/, last accessed Dec. 20, 2022.

Lakshmanan, Sriram, et al. "Practical beamforming based on RSSI measurements using off-the-shelf wireless clients." In Proceedings of the 9th ACM SIGCOMM conference on Internet measurement, pp. 410-416. Nov. 2009.

Cavazos, Jessy, "5G Beamforming: How to Test Complex Beamformer ICs," available at: https://blogs.keysight.com/blogs/inds.entry.html/2019/05/31/5g_beamforming_how-JPG6.html, last accessed Dec. 2022.

IBM, "Wi2—Helping people get the most out of their stay in Japan with deep insight into visitor preferences," available at https://www.ibm.com/case-studies/wi2, last accessed Dec. 20, 2022.

International Search Report, International Application No. PCT/IB2024/050379, Mar. 26, 2024, 14 pgs.

Safir et al., "Variational Autoencoders for Semi-Supervised Deep Metric Learning," Proceedings of the 21st Python in Science Conference (SCIPY), 2022, pp. 231-239, DOI:10.25080/majora-212e5952-022.

* cited by examiner

AUGMENTED CONFIGURATION INTERFACE FOR VISUALIZING AND OPTIMIZING BEAMFORMING

BACKGROUND

Field of the Invention

This invention relates to wireless networking, and more particularly to systems and methods for configuring wireless networking signals.

Background of the Invention

Beamforming is a technique wherein a wireless signal is focused or concentrated on one or more receiving devices as opposed to having the wireless signal evenly propagated in all directions, as typically occurs with a broadcast antenna. This technique results in a higher quality signal reaching the receiving devices, as well as increased coverage capacity for the transmitting device. This, in turn, may result in faster data transfers and fewer errors. Signal interference between receiving devices may also be reduced or avoided since wireless signals are focused where they are needed.

Despite all of its potential advantages, however, beamforming may add significant complexity to wireless networking as well as require significantly more computing resources. The processing requirements for implementing and maintaining beamforming technology have cost, hardware, and energy implications. In addition, configuring a router, access point, or other networking hardware that is capable of beamforming can be quite complex. The beamforming hardware may need to function in a three-dimensional environment where receivers have different locations in three dimensions and the signals themselves are propagated with different magnitudes and directions in three dimensions. This may, in certain cases, make configuring the beamforming networking hardware very complex.

SUMMARY

The invention has been developed in response to the present state of the art and, in particular, in response to the problems and needs in the art that have not yet been fully solved by currently available systems and methods. Accordingly, systems and methods have been developed for configuring beamforming for network devices such as a wireless routers or access points. The features and advantages of the invention will become more fully apparent from the following description and appended claims, or may be learned by practice of the invention as set forth hereinafter.

Consistent with the foregoing, a method for configuring beamforming for a network device is disclosed. In one embodiment, such a method includes creating a map of an area in which a network device that supports beamforming is placed. The method shows, on an interactive display device, the network device on the map. The method shows, on the interactive display device, one or more beams emanating from the network device on the map. The method enables a user to manipulate the beams on the interactive display device to create a desired beamforming pattern that takes into account the map and receiving devices located in the area. The claimed method is advantageous in that it may enable a user to establish or modify a beamforming pattern in a more intuitive, visual way.

In certain embodiments, the map includes a floorplan associated with the area. Similarly, in certain embodiments, the network device is a wireless router or a wireless access point. The interactive display device may include a virtual reality device, augmented reality device, holographic interface, or the like. In certain embodiments, the map is a three-dimensional map and the beams are represented in three dimensions on the three-dimensional map. This may advantageously assist a user in visualizing the beamforming pattern in three dimensions. The method may also, in certain embodiments, establish weights for each of the receiving devices and adjust the beamforming pattern in a way that takes the weights into account. This may advantageously assist a user in prioritizing certain receiving devices over others to ensure that the beamforming pattern reflects the priority of the devices. In certain embodiments, the method learns beamforming patterns occurring over time in order to recommend the desired beamforming pattern. This may advantageously enable a current or future beamforming pattern to be optimized based on beamforming patterns that have been observed in the past.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
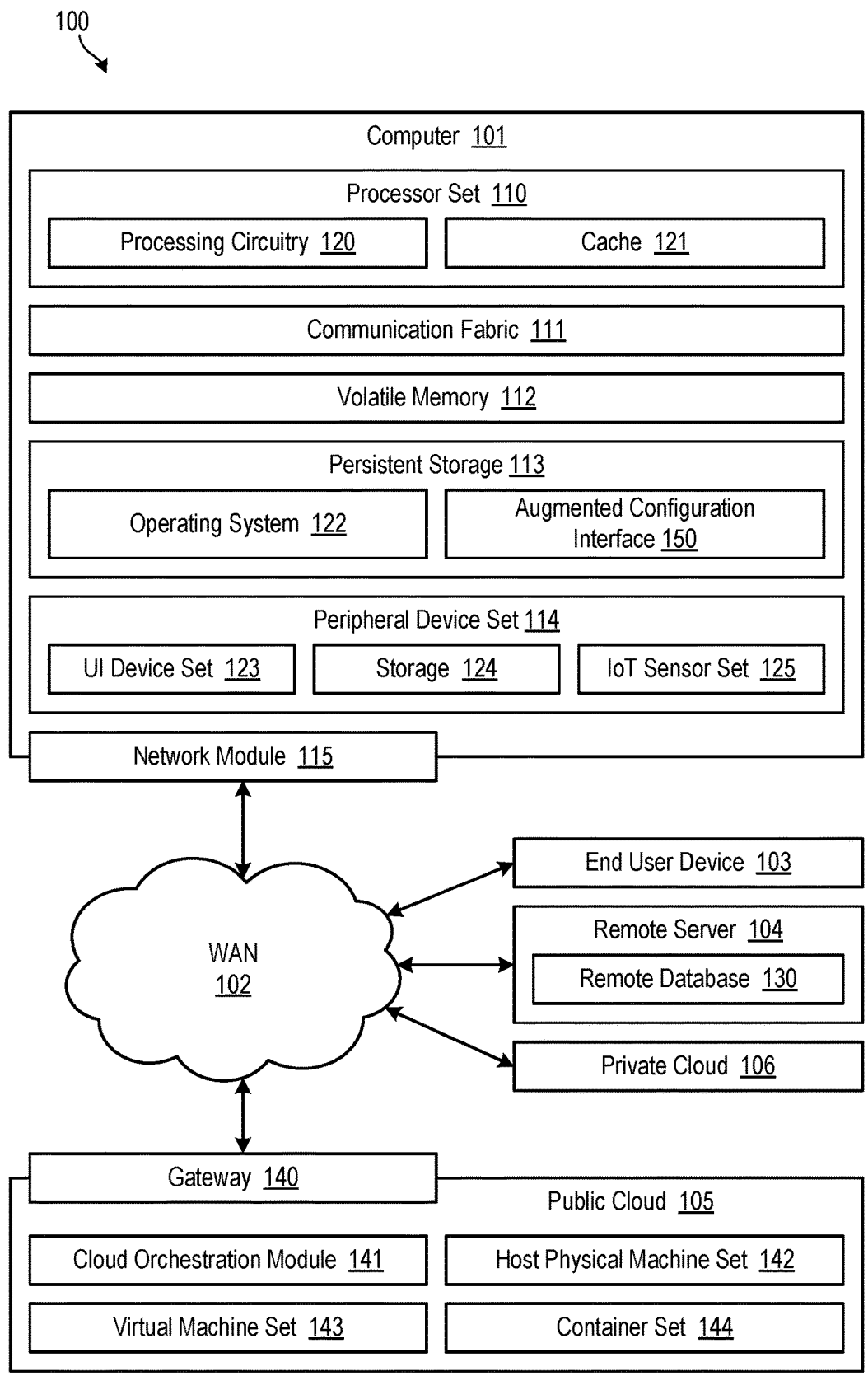
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 for configuring beamforming for a network device (i.e., collectively referred to herein as an "augmented configuration interface 150"). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
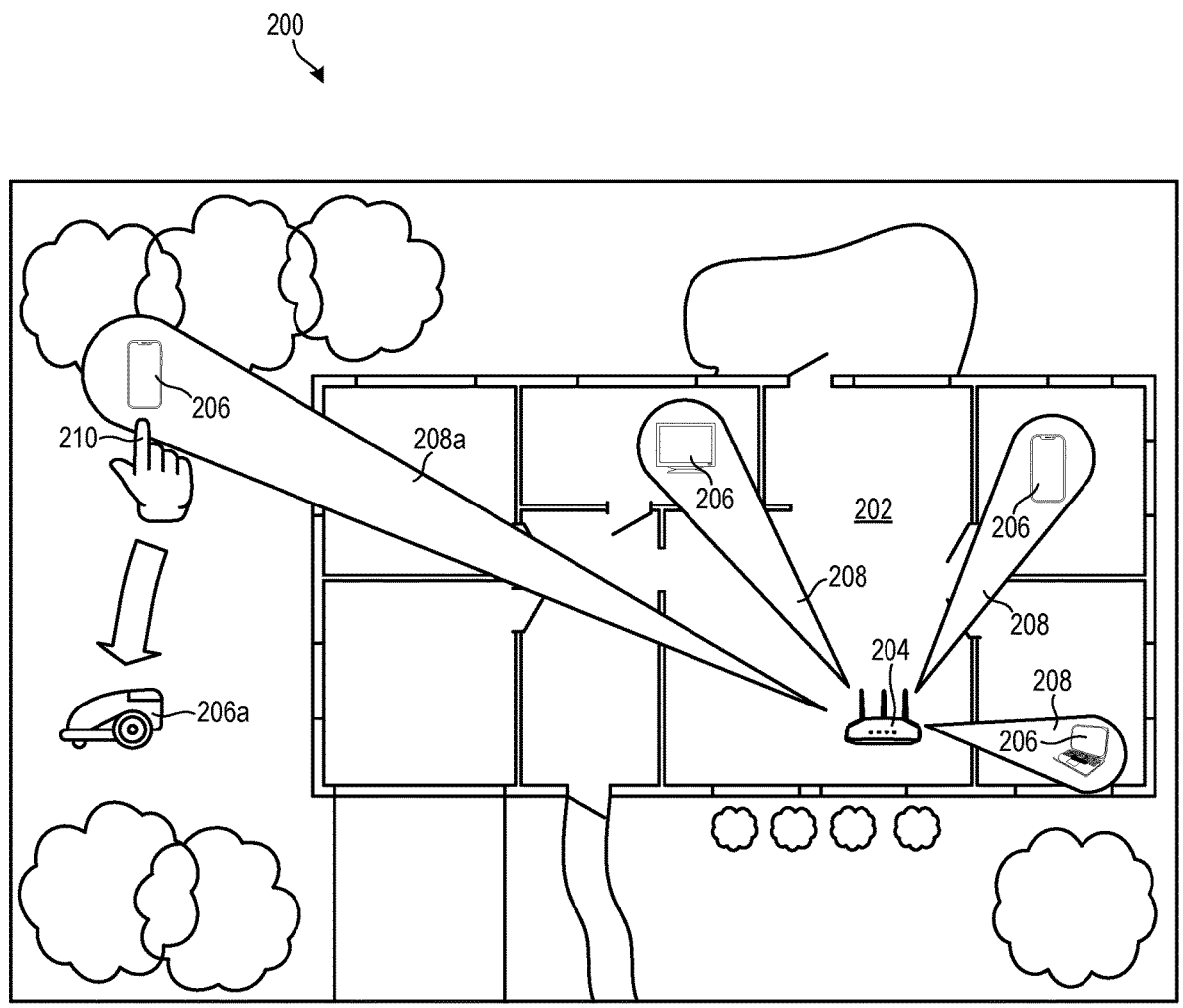
FIG. 2 is a high-level block diagram showing one embodiment of a map that describes an area in which a network device that supports beamforming is placed.

Referring to FIG. 2, as previously mentioned, beamforming is a technique wherein a wireless signal is focused or concentrated on one or more receiving devices as opposed to having the wireless signal evenly distributed in all directions, as typically occurs with a broadcast antenna. This technique results in a higher quality signal reaching the receiving devices, as well as increased coverage capacity for the transmitting device. This, in turn, may result in faster data transfers and fewer errors. Signal interference between receiving devices may also be reduced or avoided since wireless signals are focused where they are needed.

Despite all of its potential advantages, however, beamforming may add significant complexity to wireless networking as well as require significantly more computing resources. The processing requirements for implementing and maintaining beamforming technology have cost, hardware, and energy implications. In addition, configuring a router, access point, or other networking hardware that is capable of beamforming can be quite complex. The beamforming hardware may need to function in a three-dimensional environment where receivers have different locations in three dimensions and the signals themselves are propagated with different magnitudes and directions in three dimensions. This may, in certain cases, make configuring the beamforming networking hardware very complex.

In certain embodiments, in order to reduce the complexity of setting up and configuring beamforming for a network device, a system in accordance with the invention (hereinafter referred to as an "augmented configuration interface 150") may enable a user to establish a map within an interactive display device (e.g., a virtual reality device, augmented reality device, holographic interface, etc.). This map 200 may describe an area in which beamforming is to be configured. The map 200 may be provided in two or three dimensions depending on the application involved.

In certain embodiments, this map may include a floorplan if the area is within a building or includes one or more buildings or structures in the area that is intended to be covered by the beamforming pattern. For example, FIG. 2 shows one embodiment of a map 200 that may establish a coverage area for a network device (e.g., a wireless router or wireless access point) that supports beamforming. In this particular example, the map 200 includes a floorplan 202 for a building or other structure within the map 200, although this is not necessary in all embodiments. The map 200 may define an indoor, outdoor, or combination area (i.e., indoor and outdoor area) in which a network device is to provide beamforming coverage.

As shown, in certain embodiments, the augmented configuration interface 150 may enable a network device 204 to be placed within the map 200 consistent with where the network device 204 is or will be placed within a real-world environment that corresponds to the map 200. Similarly, the augmented configuration interface 150 may enable receiving devices 206 (e.g., smart phones, computers, tablets, televisions, etc.) to be placed or shown on the map 200 at the locations where they are or are intended to be in the real-world environment. Similarly, the augmented configuration interface 150 may enable a beamforming pattern, propagating from the network device 204, to be overlayed on the map 200 to show where the network device's beams 208 are or will propagate from the network device 204. This may enable a user to visualize a beamforming pattern within a particular environment.

As shown, the beams 208 may differ in magnitude and direction depending on the location of the receiving devices 206 to which the beams 208 are directed. In certain embodiments, the beams 208 are static, meaning that once they are configured they may retain their magnitude and/or direction until they are updated or reconfigured. In other embodiments, the beams 208 may dynamically change based on conditions within the map 200 or real-world environment. For example, the number, direction, and or magnitude of the beams 208 may change in response to changes to a number of receiving devices 206, locations of receiving devices 206, signal strength detected from the receiving devices 206, the map 200 or real-world environment that corresponds to the map 200, environmental conditions (weather, obstructions, etc.), or the like.

In certain embodiments, the augmented configuration interface 150 may enable weights to be assigned to the receiving devices 206. These weights may, in certain embodiments, correspond to priorities of the receiving devices 206. This may enable beams 208 to be focused on receiving devices 206 having the greatest priority, thereby ensuring that higher priority receiving devices 206 receive the strongest signal from the network device 204. The augmented configuration interface 150 may, in certain embodiments, enable these weights to be changed or updated as the priorities of the receiving devices 206 change.

The augmented configuration interface 150 may, in certain embodiments, enable a beamforming pattern to be updated in an interactive and intuitive way. For example, given a map 200 with devices 204, 206 and beams 208 overlaid thereon, reconfiguring the beamforming pattern may be as simple as selecting (e.g., with a mouse pointer, finger, etc.) a beam 208 and dragging the beam 208 to a new location on the map 200. This technique may be used to alter the direction and/or magnitude of a particular beam 208. A similar technique may be used to create new beams 208 or eliminate existing beams 208 on the map 200. This may occur in either two or three dimensions depending on the application involved. Similarly, changing the weight of a receiving device 206 may be as simple as selecting a receiving device 206 on the map 200 and setting or updating information for the receiving device 206. The same or similar technique may be used to update a configuration of a transmitting network device 204.

Figure 3:
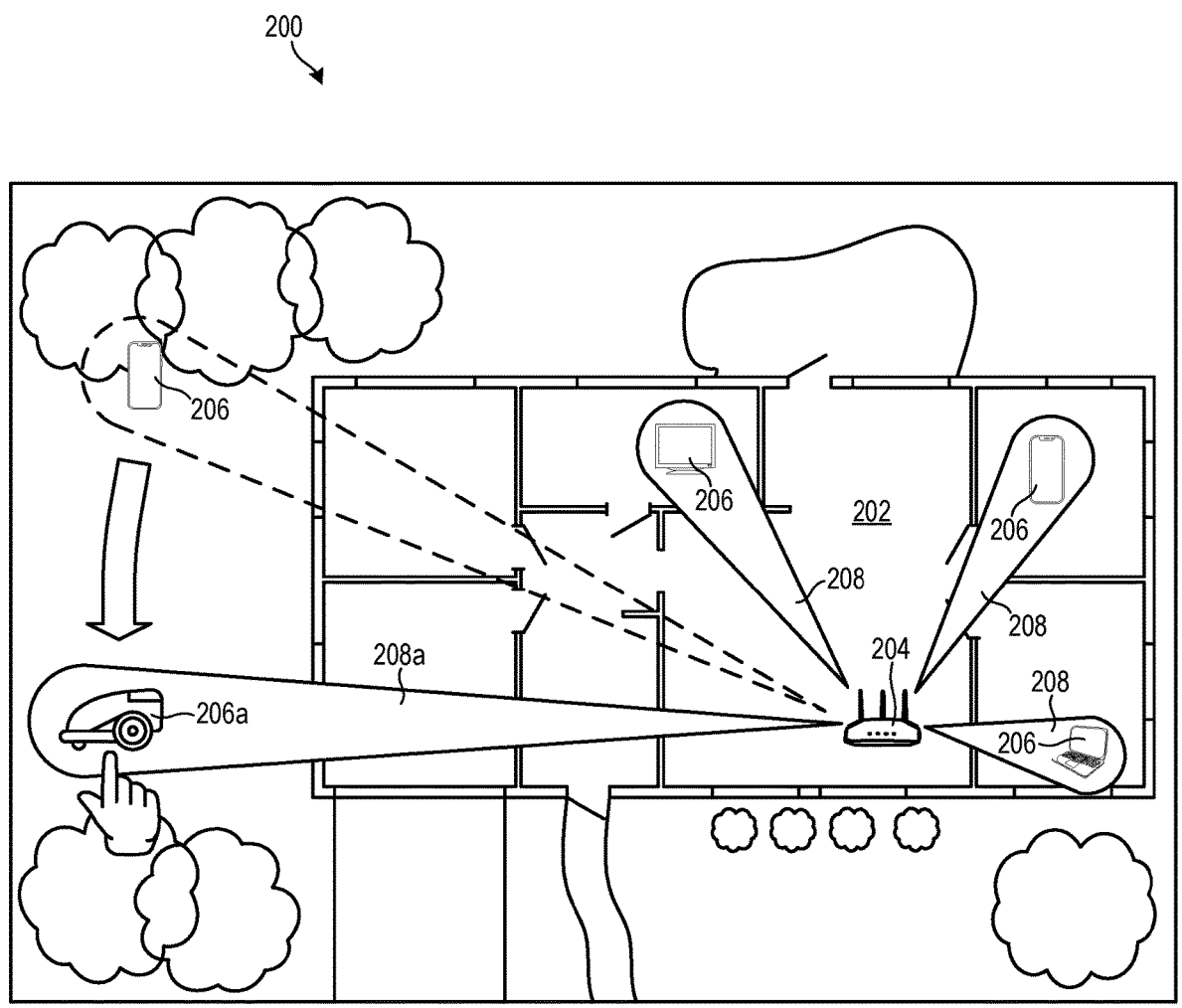
FIG. 3 is a high-level block diagram showing one example of a technique that may be used to adjust a beamforming pattern for receiving devices on the map.

For example, as shown in FIG. 2, assume that a user wishes to redirect the beam 208a onto a new receiving device 206a, in this example an electric lawnmower 206a with wireless connectivity. In order to redirect the beam 208a, the user may select the beam 208 a with a mouse pointer 210 or finger 210 and drag the beam 208a to a new location, namely over the lawnmower 206a. This may create a new beamforming pattern as shown in FIG. 3. In certain embodiments, the new beam 208a is static, meaning that it may stay at the place where it is dragged. In other embodiments, the new beam 208a is dynamic such that it may change in magnitude and/or direction. For example, if the electric lawnmower 206a moves around the area of the map 200, the changes in location may be detected and the beam 208 may be redirected to reflect the changing location.

As mentioned above, in certain embodiments, an interactive display device associated with the augmented configuration interface 150 may include a virtual reality device, augmented reality device, holographic interface, or the like. In the case of a virtual reality device, the map 200 may, in certain embodiments, be presented to a user as a three-dimensional virtual reality environment. The network device 204, receiving devices 206, and beamforming pattern may be presented to the user in the virtual reality environment in proper relation to the map 200. The user may reconfigure the beamforming pattern by interacting with and manipulating the beamforming pattern in the virtual reality environment. Various types of hardware, such as a virtual reality headset, may be used to implement the augmented configuration interface 150 in the virtual reality environment.

Alternatively, or additionally, the augmented configuration interface 150 may be configured to function in an augmented reality environment. For example, in certain embodiments, virtual representations of the network device 204, receiving devices 206, and/or beamforming pattern may be overlaid onto a real-world scene presented through a device, such as a pair of augmented reality glasses, smartphone, tablet, or the like. In other contemplated embodiments, the augmented configuration interface 150 may be implemented as a holographic interface.

Figure 4:
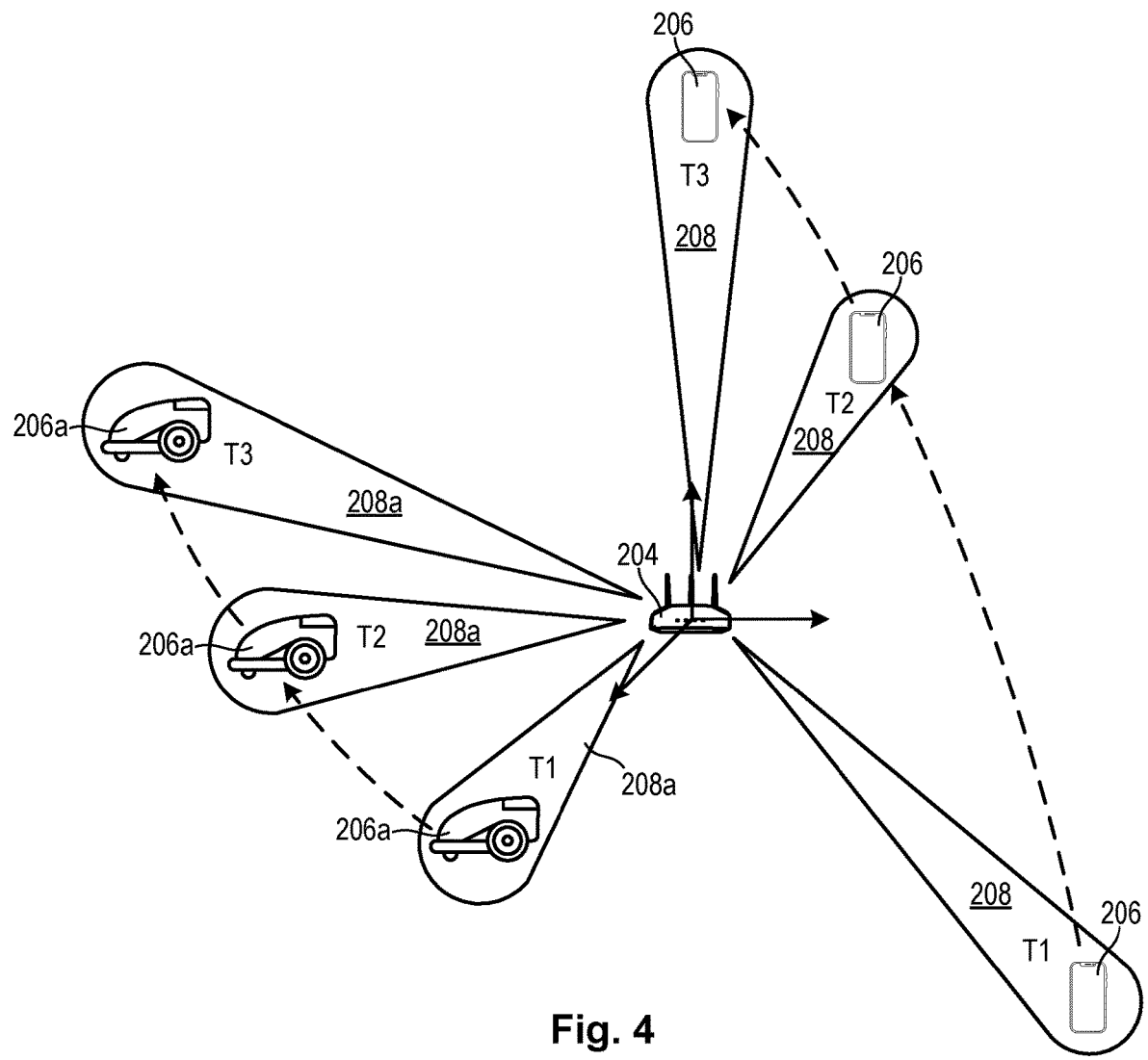
FIG. 4 is a high-level block diagram showing how a beamforming pattern may change over time as the locations of receiving devices change.

Referring to FIG. 4, as previously mentioned, receiving devices 206 may move within an area defined by a map 200. For example, FIG. 4 shows a receiving device 206a (i.e., an electric lawnmower 206a) and a receiving device 206 (e.g., a smartphone) that have different locations at a first time (T1), second time (T2), and third time (T3). In response, the beamforming pattern may be configured to dynamically change over time to alter the magnitude and/or direction of the beams 208 to reflect the changing locations of the receiving devices 206, 206a.

In certain embodiments, the augmented configuration interface 150 may be configured to learn how a beamforming pattern has changed over time to predict how the beamforming pattern may be optimized in the future. The augmented configuration interface 150 may, in certain embodiments, use machine learning to accomplish this. Specifically, the augmented configuration interface 150 may be trained with past location or movement data of the receiving devices 206, 206a in order to predict how the beamforming pattern should change in the future.

Figure 5:
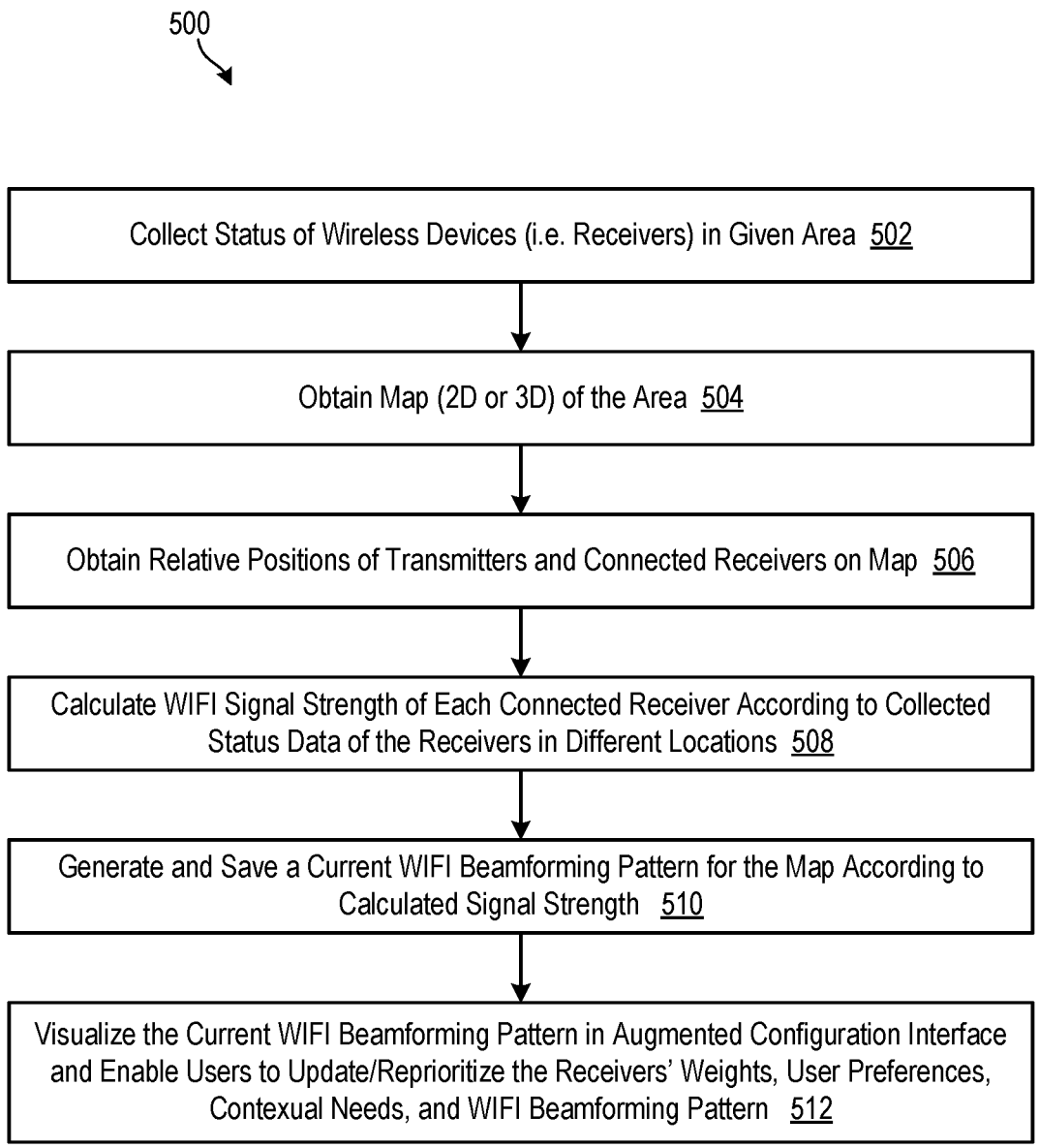
FIG. 5 is a process flow diagram showing one embodiment of a method for visualizing and managing a beamforming pattern.

Referring to FIG. 5, one embodiment of a method 500 for visualizing and managing a beamforming pattern is illustrated. Such a method 500 may, in certain embodiments, be executed by the augmented configuration interface 150. As shown, the method 500 initially collects 502 the status of wireless devices (e.g., receiving devices 206) in a given area. The method 500 then obtains 504 a map 200 (either in two or three dimensions) of the area. The relative positions of a transmitting device 204 (e.g., transmitting network device 204) and receiving devices 206 on the map 200 may then be obtained 506. The method 500 then calculates 508 the wireless signal strength of each connected receiving device 206 from the data collected at step 502. Using the calculated signal strength, the method 500 generates 510 and saves 510 a current wireless beamforming pattern for the map 200. The method 500 then visualizes 512 the current wireless beamforming pattern in the augmented configuration interface 150 and enables 512 a user to update/reprioritize the weights of the receiving devices 206, user preferences, contextual needs, and the beamforming pattern.

Figure 6:
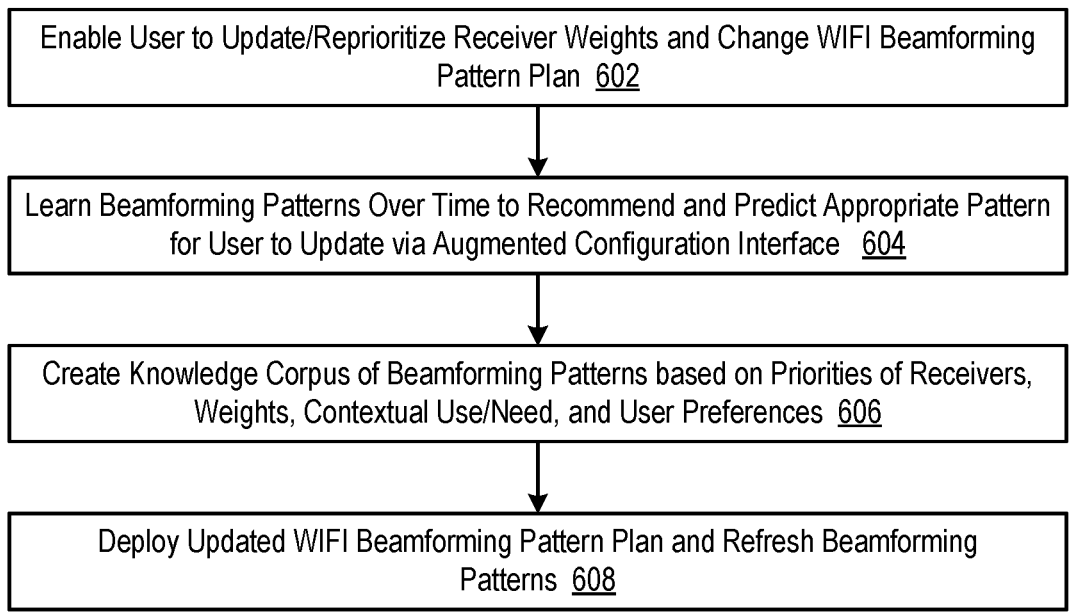
FIG. 6 is a process flow diagram showing one embodiment of a method for rebalancing the priority of receiving devices.

Referring to FIG. 6, one embodiment of a method 600 for rebalancing priorities of receiving devices 206 is illustrated. Such a method 600 may, in certain embodiments, be executed by the augmented configuration interface 150. As shown, the method 600 enables 602 a user to update/reprioritize the weights of receiving devices 206 and change 604 a wireless beamforming pattern plan. The method 600 learns 604 beamforming patterns over time to recommend and predict an appropriate beamforming pattern for a user to update via the augmented configuration interface 150. The method 600 may further create 606 a knowledge corpus of beamforming patterns based on priorities of the receiving devices 206, weights of the receiving devices 206, contextual use/need, and/or user preferences. The method 600 deploys 608 an updated beamforming pattern plan and refreshes 608 beamforming patterns in the network device 204.

Figure 7:
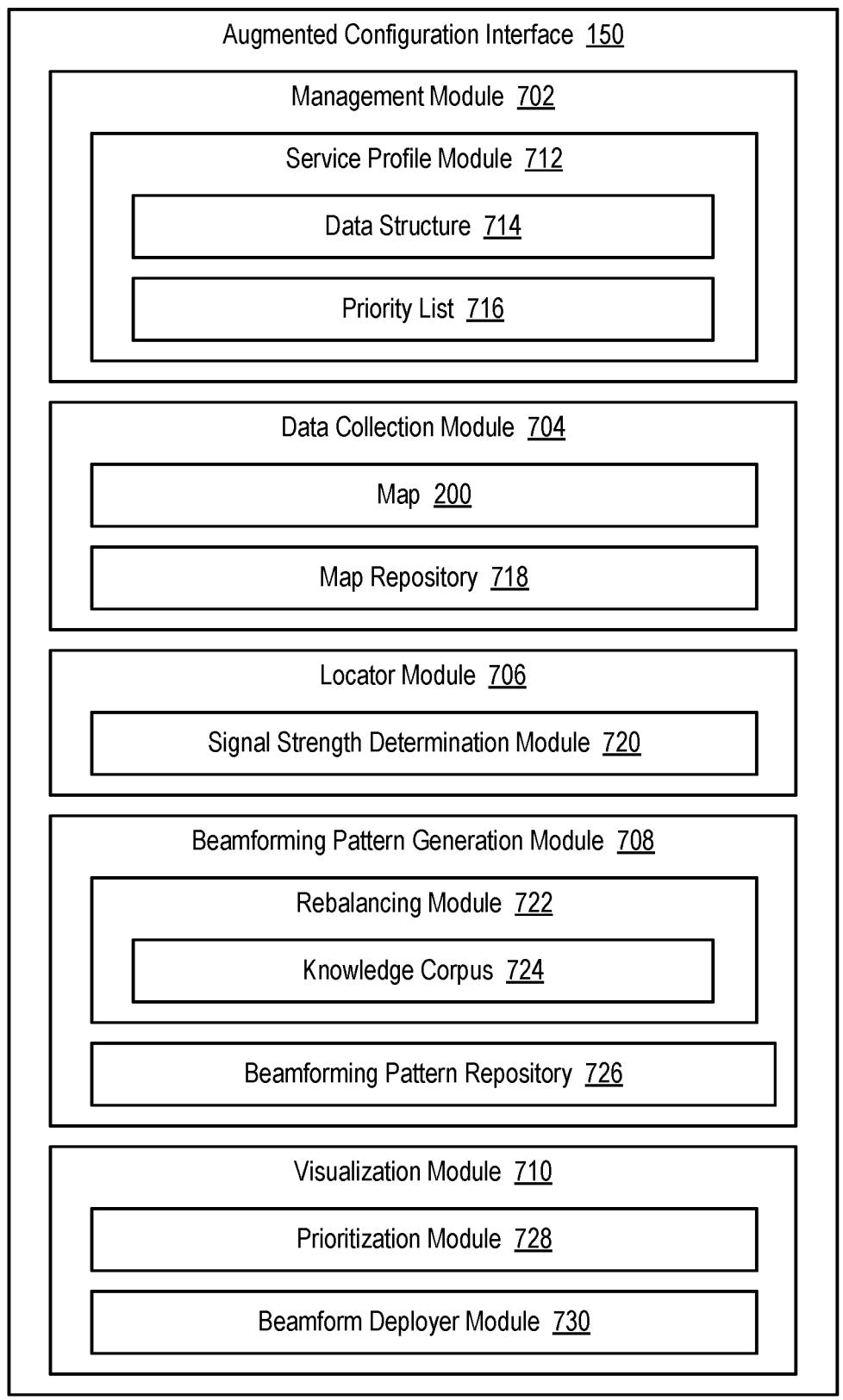
FIG. 7 is a high-level block diagram showing an augmented configuration interface and various sub-modules that may be used to configure beamforming for a network device.

FIG. 7 is a high-level block diagram showing an augmented configuration interface 150 and various sub-modules that may be used to configure beamforming for a network device 204. The augmented configuration interface 150 and associated sub-modules may be implemented in hardware, software, firmware, or combinations thereof. The augmented configuration interface 150 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the augmented configuration interface 150 may include one or more of a management module 702, data collection module 704, locator module 706, beamforming pattern generation module 708, and visualization module 710. The management module 702 may contain a service profile module 712, which may reference a data structure 714 and a priority list 716. The data collection module 704 may reference a map 200 and a map repository 718. The locator module 706 may include a signal strength determination module 720. The beamforming pattern generation module 708 may include a rebalancing module 722, which may reference a knowledge corpus 724, and a beamforming pattern repository 726. The visualization module 710 may include a prioritization module 728 and a beamform deployer module 730.

The management module 702 and service profile module 712 may manage a current configuration of a beamforming pattern in a transmitting device 204. In certain embodiments, the management module 702 and service profile module 712 may accomplish this by maintaining a data structure 714 that defines the current beamforming pattern and configuration parameters. For example, the data structure 714 may identify the map 200 that is being used by the augmented configuration interface 150, the wireless transmitting device 204 (i.e., wireless network device 204) that is producing the beamforming pattern, a list of receiving devices 206 that are receiving the wireless signal from the transmitting device 204 and/or are located on the map 200, locations of the receiving devices 206, and/or the current beamforming pattern that is being implemented by the transmitting device 204. The management module 702 and service profile module 712 may assist in keeping the information in the data structure 714 updated as the information changes, or as changes are made to the configuration.

The priority list 716 may rank the receiving devices 206 in order of priority. In certain embodiments, this may be accomplished by recording a weight for each receiving device 206 in the list 716. The management module 702 and service profile module 712 may assist in keeping the priority list 716 updated as the weights or other priority information changes.

The data collection module 704 may assist in collecting data for the augmented configuration interface 150. For example, the data collection module 704 may collect the status of connected receiving devices 206. The data collection module 704 may also collect data about the map 200 previously described. This may include collecting floorplans 202 for any building or structures that are in the map 200. In certain embodiments, the data collection module 704 may enable a user to input a floorplan 202 in two or three dimensions. This may, in certain embodiments, include enabling a user to draw the floorplan 202 for input to the data collection module 704. In certain embodiments, the data collection module 704 may also store maps 200 and/or floorplans 202 that have been gathered for use with the augmented configuration interface 150 in a map repository 718.

The locator module 706 may be used to locate (i.e., determine (x,y,z) relative positions or coordinates) a transmitting device 204 and/or receiving devices 206 on the map 200. In certain embodiments, the locator module 706 may utilize a signal strength determination module 720 to make this determination, which may detect the signal strength of the transmitting device 204 and/or receiving devices 206. In certain embodiments, triangulation techniques may be used in combination with a detected signal strength to determine a relative location of a device. In other embodiments, the locator module 706 may use other techniques or technologies, such as GPS coordinates, for determining the location of a transmitting device 204 or receiving device 206 on the map 200.

Using the locations and signal strengths of the transmitting device 204 and receiving devices 206, and their relative importance (e.g., weights), the beamforming pattern generation module 708 may determine a beamforming pattern for use by the transmitting device 204 for the current map 200. In certain embodiments, this beamforming pattern (as well as past beamforming patterns) may be saved in a beamforming pattern repository 726. The rebalancing module 722 may be used to modify the beamforming pattern in response to changes to parameters such as the locations of the transmitting device 204 and/or receiving devices 206, the weights of the receiving devices 206, the signal strength of the receiving devices 206, contextual use/need, user preferences, or the like.

In certain embodiments, the rebalancing module 722 may also be configured to learn how a beamforming pattern has changed over time to suggest or predict a beamforming pattern going forward or in the future. The rebalancing module 722 may in certain embodiments use machine learning to make these predictions or suggestions. In certain embodiments, the rebalancing module 722 may reference a knowledge corpus 724 that stores beamforming patterns based on priorities of the receiving devices 206, weights associated with the receiving devices 206, locations of the transmitting device 204 and/or receiving devices 206, contextual use/need, user preferences, and/or the like.

The visualization module 710 may enable a user to visualize the beamforming pattern in a particular map 200, which may include one or more floorplans 202. This may be performed in two or three dimensions. In certain embodiments, this may be accomplished using an interactive display device such as a virtual reality device, augmented reality device, holographic interface, or the like. The visualization module 710 may also enable a user to interactively make modifications to the beamforming pattern or other configuration parameters. For example, the visualization module 710 may enable a user to reconfigure a beamforming pattern by selecting (e.g., with a mouse pointer, finger, etc.) a beam 208 of the beamforming pattern and dragging the beam 208 to a different location on a map 200. A prioritization module 728 within the visualization module 710 may enable a user to change the beamforming pattern (or a beamforming pattern plan) by modifying weights associated with the receiving devices 206. When a beamforming pattern or beamforming pattern plan is determined or modified in the augmented configuration interface 150, the beamform deployer module 730 may deploy the beamforming pattern or beamforming pattern plan (e.g., a plan of how the beamforming pattern is to change over time) in the transmitting device 204.

Figure 8:
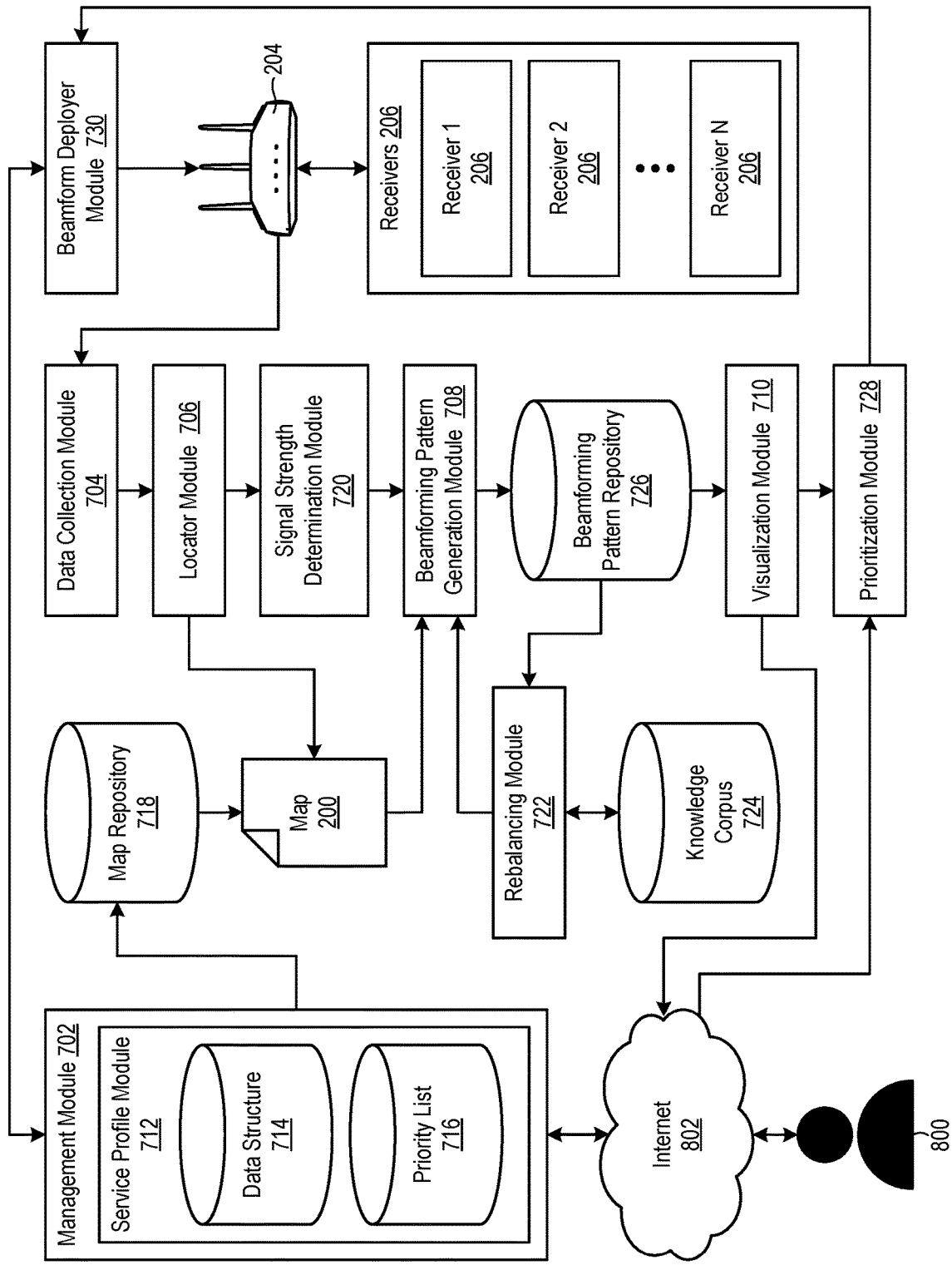
FIG. 8 is a flow diagram showing data flow and interaction between the modules illustrated in FIG. 7.

Referring to FIG. 8, a flow chart is illustrated to show interaction and data flow between the modules illustrated in FIG. 7. As shown in FIG. 8, a user 800 may manage a current configuration of the beamforming pattern and augmented configuration interface 150 by way of the management module 702 and service profile module 712. This configuration may be stored in a data structure 714 that records the current beamforming pattern and other configuration parameters, as previously discussed. Other data structures, such as the priority list 716, may record priorities (e.g., weights) for receiving devices 206 associated with the beamforming pattern.

As shown in FIG. 8, the data collection module 704 may collect data (e.g., status data) from the transmitting device 204 and receiving devices 206. This data may be used by the locator module 706 to locate the transmitting device 204 and receiving devices 206 on the map 200. This may be accomplished with assistance from the signal strength determination module 720, which may measure the signal strength of the receiving devices 206. The location data may be passed to the beamforming pattern generation module 708 to determine a beamforming pattern to effectively communicate between the transmitting device 204 and the receiving devices 206. This beamforming pattern may be recorded in the beamforming pattern repository 726. The beamforming pattern may be created in relation to the map 200, which may be pulled from the map repository 718.

As further shown in FIG. 8, using data in the knowledge corpus 724 and/or beamforming pattern repository 726, the rebalancing module 722 may be used to adjust the beamforming pattern as needed. This may be in response to changes to the locations of the transmitting device 204 and/or receiving devices 206, weights of the receiving devices 206, signal strength of the receiving devices 206, contextual use/need, user preferences, or the like.

When a beamforming pattern is established, the visualization module 710 may enable a user 800 to visualize the beamforming pattern in two or three dimensions. In certain embodiments, this may be accomplished using an interactive display device such as a virtual reality device, augmented reality device, holographic interface, or the like. In certain embodiments, the visualization module 710 may enable a user to interactively modify the beamforming pattern or other configuration parameters. The prioritization module 728 may enable the user 800 to change the beamforming pattern (or a beamforming pattern plan) by modifying weights associated with the receiving devices 206. When a beamforming pattern or beamforming pattern plan is established or modified, the beamform deployer module 730 may implement or deploy the beamforming pattern (or beamforming pattern plan) in the transmitting device 204.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Several examples will now be provided to further clarify various aspects of the present disclosure:

Example 1: A method for configuring beamforming for a network device includes creating a map of an area in which a network device that supports beamforming is placed. The method shows, on an interactive display device, the network device on the map. The method shows, on the interactive display device, one or more beams emanating from the network device on the map. The method enables a user to manipulate the beams on the interactive display device to create a desired beamforming pattern that takes into account the map and receiving devices located in the area.

Example 2: The limitations of Example 1, wherein the map includes a floorplan associated with the area.

Example 3: The limitations of any of Examples 1 and 2, wherein the network device is one of a wireless router and a wireless access point.

Example 4: The limitations of any of Examples 1-3, wherein the interactive display device is one of a virtual reality device, augmented reality device, and holographic interface.

Example 5: The limitations of any of Examples 1-4, wherein the map is a three-dimensional map and the beams are represented in three dimensions on the three-dimensional map.

Example 6: The limitations of any of Examples 1-5, further comprising establishing weights for each of the receiving devices and adjusting the beamforming pattern in a way that takes the weights into account.

Example 7: The limitations of any of Examples 1-6, further comprising learning beamforming patterns occurring over time in order to recommend the desired beamforming pattern.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

Example 10: A method for configuring beamforming for a network device includes creating a map of an area in which a network device that supports beamforming is placed. The method shows, on an interactive display device, the network device on the map. The method shows, on the interactive display device, one or more beams emanating from the network device on the map. The method enables a user to manipulate the beams on the interactive display device to create a desired beamforming pattern that takes into account the map and receiving devices located in the area. The method further establishes weights for each of the receiving devices and adjusts the beamforming pattern in a way that takes the weights into account.

Example 11: The limitations of Example 10, wherein the map is a floorplan associated with the area.

Example 12: The limitations of any of Examples 10 and 11, wherein the interactive display device is one of a virtual reality device, augmented reality device, and holographic interface.

Example 13: A system comprising one or more processor and one or more computer-readable storage media collectively storing program instructions which, when executed by the processor, are configured to cause the processor to perform a method according to any of Examples 10-12.

The invention claimed is:

1. A method for configuring beamforming for a network device, the method comprising:
   creating a map of an area in which a network device that supports beamforming is placed;
   showing, on an interactive display device, the network device and receiving devices on the map consistent with where the network device and the receiving devices are located in a real-world environment that corresponds to the map;
   showing, on the interactive display device, one or more beams emanating from the network device on the map; and
   enabling a user to manipulate the one or more beams on the interactive display device to create a desired beamforming pattern that takes into account the map and the receiving devices located in the area, wherein at least one beam of the one or more beams is configured to be manipulated by the user dragging the at least one beam to a new location on the map.

2. The method of claim 1, wherein the map includes a floorplan associated with the area.

3. The method of claim 1, wherein the network device is one of a wireless router and a wireless access point.

4. The method of claim 1, wherein the interactive display device is one of a virtual reality device, augmented reality device, and holographic interface.

5. The method of claim 1, wherein the map is a three-dimensional map and the beams are represented in three dimensions on the three-dimensional map.

6. The method of claim 1, further comprising establishing weights for each of the receiving devices and adjusting the beamforming pattern in a way that takes the weights into account.

7. The method of claim 1, further comprising learning beamforming patterns occurring over time in order to recommend the desired beamforming pattern.

8. A computer program product for configuring beamforming for a network device, the computer program product comprising a computer-readable storage medium having computer-usable program code embodied therein, the computer-usable program code configured to perform the following when executed by at least one processor:
   create a map of an area in which a network device that supports beamforming is placed;
   show, on an interactive display device, the network device and receiving devices on the map consistent with where the network device and the receiving devices are located in a real-world environment that corresponds to the map;
   show, on the interactive display device, one or more beams emanating from the network device on the map; and
   enable a user to manipulate the one or more beams on the interactive display device to create a desired beamforming pattern that takes into account the map and the receiving devices located in the area, wherein at least one beam of the one or more beams is configured to be manipulated by the user dragging the at least one beam to a new location on the map.

9. The computer program product of claim 8, wherein the map is a floorplan associated with the area.

10. The computer program product of claim 8, wherein the network device is one of a wireless router and a wireless access point.

11. The computer program product of claim 8, wherein the interactive display device is one of a virtual reality device, augmented reality device, and holographic interface.

12. The computer program product of claim 8, wherein the map is a three-dimensional map and the beams are represented in three dimensions on the three-dimensional map.

13. The computer program product of claim 8, wherein the computer-usable program code is further configured to establish weights for each of the receiving devices and adjust the beamforming pattern in a way that takes the weights into account.

14. The computer program product of claim 8, wherein the computer-usable program code is further configured to learn beamforming patterns occurring over time in order to recommend the desired beamforming pattern.

15. A system for configuring beamforming for a network device, the system comprising:
   at least one processor;
   at least one memory device operably coupled to the at least one processor and storing instructions for execution on the at least one processor, the instructions causing the at least one processor to:
   create a map of an area in which a network device that supports beamforming is placed;
   show, on an interactive display device, the network device and receiving devices on the map consistent with where the network device and the receiving devices are located in a real-world environment that corresponds to the map;
   show, on the interactive display device, one or more beams emanating from the network device on the map; and
   enable a user to manipulate the one or more beams on the interactive display device to create a desired beamforming pattern that takes into account the map and the receiving devices located in the area, wherein at least one beam of the one or more beams is configured to be manipulated by the user dragging the at least one beam to a new location on the map.

16. The system of claim 15, wherein the map is a floorplan associated with the area.

17. The system of claim 15, wherein the network device is one of a wireless router and a wireless access point.

18. The system of claim 15, wherein the interactive display device is one of a virtual reality device, augmented reality device, and holographic interface.

19. The system of claim 15, wherein the map is a three-dimensional map and the beams are represented in three dimensions on the three-dimensional map.

20. The system of claim 15, wherein the instructions further cause the at least one processor to establish weights for each of the receiving devices and adjust the beamforming pattern in a way that takes the weights into account.

21. The system of claim 15, wherein the instructions further cause the at least one processor to learn beamforming patterns occurring over time in order to recommend the desired beamforming pattern.

22. A method for configuring beamforming for a network device, the method comprising:
   creating a map of an area in which a network device that supports beamforming is placed;
   showing, on an interactive display device, the network device and receiving devices on the map consistent with where the network device and the receiving devices are located in a real-world environment that corresponds to the map;
   showing, on the interactive display device, one or more beams emanating from the network device on the map;
   enabling a user to manipulate the one or more beams on the interactive display device to create a desired beamforming pattern that takes into account the map and the receiving devices located in the area, wherein at least one beam of the one or more beams is configured to be manipulated by the user dragging the at least one beam to a new location on the map; and
   establishing weights for each of the receiving devices and adjusting the beamforming pattern in a way that takes the weights into account.

23. The method of claim 22, wherein the map is a floorplan associated with the area.

24. The method of claim 22, wherein the interactive display device is one of a virtual reality device, augmented reality device, and holographic interface.

25. A system for configuring beamforming for a network device, the system comprising:
- at least one processor;
- at least one memory device operably coupled to the at least one processor and storing instructions for execution on the at least one processor, the instructions causing the at least one processor to:
- create a map of an area in which a network device that supports beamforming is placed;
- show, on an interactive display device, the network device and receiving devices on the map consistent with where the network device and the receiving devices are located in a real-world environment that corresponds to the map;
- show, on the interactive display device, one or more beams emanating from the network device on the map;
- enable a user to manipulate the one or more beams on the interactive display device to create a desired beamforming pattern that takes into account the map and the receiving devices located in the area, wherein at least one beam of the one or more beams is configured to be manipulated by the user dragging the at least one beam to a new location on the map; and
- establish weights for each of the receiving devices and adjust the beamforming pattern in a way that takes the weights into account.

\* \* \* \* \*